Patented Apr. 5, 1938

2,113,304

UNITED STATES PATENT OFFICE 2,113,304

PREPARATION OF LOW VISCOSITY ESTERS OF CELLULOSE

Carl J. Malm, Rochester, N. Y., and Charles L. Fletcher, Kingsport, Tenn., assignors, by mesne assignments, to Eastman Kodak Company, Jersey City, N. J., a corporation of New Jersey No Drawing. Application May 23, 1935, Serial No. 23,070

6 Claims. (Cl. 260—101)

This invention relates to the preparation of low viscosity mixed esters of cellulose by an esterification bath containing less than 7 parts of liquid for every part of cellulose, less than 3 parts of which are fatty acid.

This application refers back as to the restricting of the proportions of reagents and any other common subject matter to our application Serial Number 647,827, filed December 31, 1932.

In preparing cellulose acetate as commonly done at the present time, it is necessary to employ a comparatively large amount of acetic acid as the solvent, due to the relatively poor solubility of the tri-ester in acetic acid. When a small amount of acetic acid is used, instead of a dope being formed, the acetate formed will gel in the reaction mixture and thus the whole batch is spoiled.

The use of such large amounts of acetic acid results in a solution or dope of a rather low viscosity, especially when cellulose acetate of low viscosity is prepared; the cellulose acetate must be preciptated from the dope by water or by a low concentration of acid in order to obtain a precipitate of sufficient particle size to make possible washing without large losses of cellulose acetate. By such a precipitation the acetic acid of the reaction mixture is so diluted that it cannot be economically recovered therefrom and it therefore represents a total loss from a practical standpoint.

If this low viscosity dope is poured into a precipitating bath having a higher concentration of acid, the precipitation occurs so slowly that the ester disperses and thus causes the formation of fine particles which present difficulties in washing, causing large handling losses.

We have found that low viscosity mixed esters of cellulose may be prepared without the disadvantages met with in the preparation of low viscosity cellulose acetate. We have found that a low viscosity mixed ester of cellulose may be prepared in an esterification bath containing less than 7 parts of liquid for every part of cellulose, less than 3 parts of which are fatty acid; this results in a dope of comparatively high viscosity which when precipitated in a liquid of high acid concentration will give a coarse precipitate which can be washed without any substantial loss.

Our invention involves the use of less acid in the esterification than was formerly thought necessary, the use of less water for precipitation with consequent economy in the recovery of the fatty acids employed and the obtaining of high yields of the low viscosity cellulose ester. The products of our invention when employed in the preparation of lacquers show great superiority over the corresponding cellulose acetates, as their solubility in cheap solvents is greater, they are compatible with gums and resins and are stable to ultra-violet light.

As the esters of the present invention have a lower cellulose content, compared with cellulose nitrate or acetate, the amount of breakdown of the cellulose necessary to obtain a certain viscosity is less than that necessary of acetate or nitrate to obtain the same viscosity. For the same concentration of ester in solvent, the low viscosity mixed esters have a lower concentration of cellulose than cellulose acetate or nitrate. For example, if 10 gms. of cellulose acetate having an acetyl content of 40% or of cellulose nitrate of 12% nitrogen content are dissolved in 90 gms. of solvent, the concentration of cellulose is 6%, while a solution of cellulose acetate butyrate having a content of 13% acetyl and 37% butyryl would under the same conditions have only a 5% cellulose concentration.

The present invention involves the preparation of low viscosity mixed fatty acid esters of cellulose in which the fatty acids contain from 2-4 carbon atoms. One part of cellulose is treated with an esterification bath of not more than 7 parts of liquid, including the anhydride; less than 3 parts of the bath are fatty acid. Up to 4½ parts of fatty acid anhydride may be employed in the esterification bath in accordance with the present invention. As a general guide in preparing our mixed esters, we may employ from 1 to 3 parts of fatty acid of 2-4 carbon atoms and from 2 to 4½ parts of fatty acid anhydride (the acid corresponding to which has 2-4 carbon atoms) so long as the total thereof does not exceed 7 parts to 1 part cellulose.

The following examples illustrate processes embodying this invention:

*I*

2½ pounds of cotton was mixed with 2 pounds of acetic acid and 5 pounds of butyric acid and the mixture was kept at 150° F. for 4 hours. Six pounds of butyric anhydride was then added and the mixture was cooled to 45° F. whereupon a mixture of 4 pounds of butyric anhydride and 45 cc. of sulfuric acid was added. The reaction temperature was allowed to rise to 115° F. and was maintained at that point for about 2 hours, when a clear solution was obtained. One pound of 50% acetic acid was added and the mixture was kept at 100° F. for 2 hours. The cellulose acetate butyrate formed can either be precipitated at this point or hydrolyzed such as by adding 6 pounds of 50% acetic acid and allowing to stand at 100° F. for the desired length of time and then precipitated.

The precipitation can be carried out by pouring the dope with stirring into acetic acid the concentration of which is governed by the extent to which the ester to be precipitated has been hydrolyzed; the greater the extent of hydrolysis the more that dilution of the precipitating liquid is desirable. For a mixed ester which has been hydrolyzed for about 10 hours at 100° F. a precipitating liquid containing 40% aqueous fatty acid is suitable. A course, easily washed precipitate was obtained. An ester so prepared was found to have an acetyl content of 14% and a butyryl content of 38% and gave, when 10 parts were dissolved in 90 parts acetone, a solution with a viscosity of 25 centipoises at 25° C.

II

The process of Example I was repeated except that propionic acid and anhydride were employed instead of butyric. The proportions were the same except that 3 pounds of propionic anhydride (in place of the 4 pounds of butyric anhydride) was employed for dissolving the catalyst. An ester so prepared was found to have an acetyl content of 10.5% and a propionyl content of 41% and gave when 10 parts were dissolved in 90 parts of acetone, a solution with a viscosity of 45 centipoises at 25° C.

By slightly less severe viscosity reducing conditions we may produce mixed fatty esters of cellulose of the type herein described, having a viscosity up to 100 centipoises and by more severe conditions, an ester having a viscosity as low as 5 centipoises, determined as above.

The esters of the present invention are eminently suitable for use in the preparation of lacquers due to the fact that they can be prepared with low viscosities without as much degradation of the cellulose as is necessary with cellulose acetates or nitrates to attain those viscosities and also because of their compatibility with gums and resins and stability to ultra-violet light.

Processes in accordance with the present invention remedy the practical difficulties which are met with in the preparation of low viscosity cellulose acetates, such as the geling of the product with the use of a small proportion of acid, the loss of acid due to the dilute condition of the precipitation bath, the fineness of the precipitate, etc. Due to the physical characteristics of low viscosity cellulose acetate, one or the other of these difficulties may present itself even though the process be modified to avoid one of them. We have found that the way to avoid these various difficulties is by the invention described herein.

In carrying out processes in accordance with our invention the proportions of acetyl and acyl groups of 3-4 carbon atoms may be varied to give the proportion of these groups desired. This may be governed by the method described and claimed in Malm and Nadeau application Serial No. 659,698 filed March 6, 1933. It is preferred, however, that the esters prepared contain a substantial proportion of the higher acyl groups.

The conditions which are employed in the esterification are those known as "viscosity-reducing conditions". These conditions involve the use of a temperature greater than that normally employed for the proportion of sulfuric acid or other strong mineral acid catalyst employed. For instance, with the use of up to about 5% of sulfuric acid based on the weight of the cellulose, normal esterification temperature is usually approximately 90°-100° F. If the temperature of esterification is maintained much above normal esterification temperature a low viscosity cellulose ester results. This temperature will be referred to as a "viscosity-reducing temperature".

We claim:

1. The process of preparing a low viscosity cellulose acetate propionate which comprises reacting, at a viscosity reducing temperature which will not cause destructive action, upon one part of cellulose with an esterifying bath containing less than 7 parts of liquid essentially consisting of 3-4 parts of propionic anhydride, 2 parts of propionic acid, ⅘ part of acetic acid and a sulfuric acid catalyst.

2. The process of preparing a low viscosity mixed ester of cellulose which comprises reacting, at a viscosity-reducing temperature which will not cause destructive action, upon one part of cellulose with an esterifying bath containing less than 7 parts of liquid essentially consisting of 2 parts of fatty acid of 3-4 carbon atoms, 3-4 parts of the corresponding anhydride, ⅘ part of acetic acid and a sulfuric acid catalyst.

3. The process of preparing a low viscosity cellulose acetate butyrate which comprises reacting, at a viscosity-reducing temperature which will not cause destructive action, upon one part of cellulose with an esterifying bath containing less than 7 parts of liquid essentially consisting of 3-4 parts of butyric anhydride, 2 parts of butyric acid, ⅘ part of acetic acid and a sulfuric acid catalyst.

4. The process of preparing a low viscosity mixed organic acid ester of cellulose which comprises reacting, at a viscosity-reducing temperature which will not cause destructive action, upon one part of cellulose with an esterifying bath containing less than 7 parts of liquid, which bath essentially consists of sulfuric acid catalyst, 1-3 parts of fatty acid, the major portion of which consists of fatty acid of 3-4 carbon atoms, the fatty acid being the sole solvent therein and 2-4½ parts of a fatty acid anhydride, the acyl of which bath consists only of groups of 2-4 carbon atoms.

5. The process of preparing a low viscosity cellulose acetate propionate which comprises reacting, at a viscosity-reducing temperature which will not cause destructive action, upon one part of cellulose with an esterifying bath containing less than 7 parts of liquid, which bath essentially consists of sulfuric acid catalyst, 1-3 parts of fatty acid, the major portion of which consists of propionic acid, the fatty acid being the sole solvent therein and 2-4½ parts of a fatty acid anhydride, the acyl of which bath consists only of groups of 2-3 carbon atoms.

6. The process of preparing a low viscosity cellulose acetate butyrate which comprises reacting, at a viscosity-reducing temperature which will not cause destructive action, upon one part of cellulose with an esterifying bath containing less than 7 parts of liquid, which bath essentially consists of sulfuric acid catalyst, 1-3 parts of fatty acid, the major portion of which consists of butyric acid, the fatty acid being the sole solvent therein and 2-4½ parts of a fatty acid anhydride, the acyl of which bath consists only of groups of 2-4 carbon atoms.

CARL J. MALM.
CHARLES L. FLETCHER.